(12) United States Patent
Fonseca

(10) Patent No.: US 10,474,807 B2
(45) Date of Patent: Nov. 12, 2019

(54) PASSWORD/ENCRYPTION PROTECTION

(71) Applicant: Danilo E. Fonseca, Centerville, UT (US)

(72) Inventor: Danilo E. Fonseca, Centerville, UT (US)

(73) Assignee: Danilo E. Fonseca, Centerville, UT (US)

( * ) Notice: Subject to any disclaimer, the term of this patent is extended or adjusted under 35 U.S.C. 154(b) by 344 days.

(21) Appl. No.: 15/487,278

(22) Filed: Apr. 13, 2017

(65) Prior Publication Data

US 2017/0220790 A1 Aug. 3, 2017

Related U.S. Application Data

(63) Continuation-in-part of application No. 12/287,768, filed on Oct. 14, 2008, now abandoned, and a continuation-in-part of application No. 13/488,243, filed on Jun. 4, 2012, now Pat. No. 9,819,681, which is a continuation of application No. 11/496,389, filed on Jul. 31, 2006, now Pat. No. 8,195,625.

(60) Provisional application No. 60/704,330, filed on Aug. 1, 2005, provisional application No. 60/999,560, filed on Oct. 17, 2007.

(51) Int. Cl.
*G06F 21/36* (2013.01)
*G06F 3/0482* (2013.01)

(52) U.S. Cl.
CPC ............ *G06F 21/36* (2013.01); *G06F 3/0482* (2013.01)

(58) Field of Classification Search
CPC ..................................................... G06F 21/36
See application file for complete search history.

(56) References Cited

U.S. PATENT DOCUMENTS

| 5,227,957 | A | | 7/1993 | Deters |
| 5,602,721 | A | | 2/1997 | Slade et al. |
| 6,157,383 | A | * | 12/2000 | Loop ................... G06F 3/04812 345/419 |
| 6,660,950 | B2 | | 12/2003 | Fonseca |
| 6,799,286 | B1 | * | 9/2004 | Evans ................. G06F 3/04895 714/57 |
| 7,093,282 | B2 | | 8/2006 | Hillhouse |
| 7,409,310 | B1 | | 8/2008 | Wade |

(Continued)

OTHER PUBLICATIONS

International application No. PCT/US2018/027670, filed Apr. 3, 2018, Written Opinion of the International Searching Authority, dated Jul. 1, 2018.

*Primary Examiner* — Khalil Naghdali
*Assistant Examiner* — Thanh H Le
(74) *Attorney, Agent, or Firm* — Kunzler Bean & Adamson, PC; Bruce R. Needham

(57) ABSTRACT

An interface, system and method of password entry in a computing device/system including a graphical user interface including a plurality of password characters displayed on a screen according to a location-based structure and selectable by a pointing device; a scrambling module that scrambles where at least a portion of the password characters are positioned within the location-based structure when triggered; and a triggering module to trigger the scrambling module. The location-based structure may be a 3-dimensional object. There is a password manager module that allows a user to upload password characters that are user customized images. Alpha-numeric characters are not scrambled.

19 Claims, 20 Drawing Sheets

(56) References Cited

U.S. PATENT DOCUMENTS

| | | |
|---|---|---|
| 8,306,504 B1 | 11/2012 | Rincker et al. |
| 2002/0040439 A1 | 4/2002 | Kellum |
| 2003/0104866 A1 | 6/2003 | Campo et al. |
| 2003/0131115 A1 | 7/2003 | Mi et al. |
| 2003/0172167 A1 | 9/2003 | Judge et al. |
| 2006/0020559 A1* | 1/2006 | Steinmetz ............... G06F 21/34 705/67 |
| 2006/0020815 A1* | 1/2006 | Varghese ................ G06F 21/36 713/182 |
| 2007/0030963 A1 | 2/2007 | Wyld et al. |
| 2007/0061589 A1 | 3/2007 | Ulmer et al. |
| 2009/0172810 A1 | 7/2009 | Won et al. |
| 2012/0268393 A1 | 10/2012 | Lee |
| 2014/0098141 A1 | 4/2014 | Sen et al. |

* cited by examiner

Static Layout

Secret Password alphanumeric and Object string

Secret Password alphanumeric
and Object string

Randomized alphanumeric and Objects.
Ready for next password Login attempt

User Interactive 3-D
Password layout

Front View

Front and Back Views of
3-D Password layout

User Interactive 3-D Password layout

Front View

User Interactive 3-D Password layout

Front View

User Interactive 3-D Password layout

Rotation to the Back View

User Interactive 3-D Password layout

User Interactive 3-D Password layout

PASSWORD/ENCRYPTION PROTECTION

REFERENCE TO RELATED APPLICATIONS

This application claims the benefit of co-pending U.S. application Ser. No. 12/287,768 by Fonseca filed on Oct. 14, 2008, the entirety of which is incorporated herein by reference along with the entirety of U.S. application Ser. No. 11/496,389, by Fonseca, filed on Jul. 31, 2006.

BACKGROUND OF THE INVENTION

Field of the Invention

The present invention relates to information and system security, specifically to authentication user interfaces, systems, and methods of authentication.

Description of the Related Art

The introduction of the digital computer revolutionized methods of computing, data processing and controlling other devices and systems. Combined with the introduction of the Internet, digital data processing, communication and storage has become an essential part of society. With the growing popularity of computers, many different types of computing systems have attained widespread use around the world. Computing systems include personal computers, servers, mainframes and a wide variety of independent 'smart devices' with capabilities to easily communicate, process, distribute, collect and store information. Personal computers (PC), mainframes, smartphones, tablets, and minicomputer networks allow user(s) access to numerous application programs, databases, network systems, operating systems and mainframe applications. To protect and access protected personal data, file(s), account(s) and hardware property from unauthorized entities, a secure password logon method is generally provided. Password protection is a method comprise of secret combinations of characters (generally alpha-numeric) that provide a consumer or business the capability to control access from unauthorized entities and protect assets from illegal or malicious intent. As computing systems evolve combined with the growth of communication networks and the continue practice of mass digital data storage, a growing concern over privacy and access control to personal information and property is created. Additionally, with the wide acceptance and reliance of Internet technologies, it has become increasingly difficult to maintain and manage numerous password(s) protection policies for Internet accounts and each application associated with databases, network systems, operating systems and mainframe(s).

In the related art, it has been known to use various techniques and systems for providing enhanced security for password logon systems. Examples include: encrypting/scrambling transmission of password characters within the system (e.g. before transmitting from keyboard to motherboard); using encryption (e.g. SSL) to transmit password logon information over a network; password change policies (e.g. requiring users to change passwords every x months/weeks); password creation policies (e.g. requiring that all passwords be at least X characters long, include at least certain types of characters, and not include certain words/strings); and displaying password characters as asterisks or other generic characters during password entry instead of displaying the actual characters.

Some improvements have been made in the field. Examples of references related to the present invention are presented hereafter, and the supporting teachings of each reference are incorporated by reference herein: U.S. Pat. No. 7,093,282 to Hillhouse; US Patent Publication No. 20070030963 by Wyld; and US Patent Publication No. 20060020815 by Varghese.

The inventions heretofore known suffer from a number of disadvantages which include being inconvenient, not being customized/customizable, being difficult to use, not able to be modified to fit changing requirements, failing to adapt to varying situations, being easily hacked through keylogging, requiring lengthy and complicated passwords, and not being easy to set up and/or change.

What is needed is a password logon interface, system and/or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular in response to the problems and needs in the art that have not yet been fully solved by currently available systems and methods. Accordingly, the present invention has been developed to provide a password logon interfaces, system and/or method.

In one non-limiting embodiment, there is a password entry user interface that may operate in the context of a computing device, and may comprise one or more of: a graphical user interface including a plurality of password characters displayed on a screen according to a location-based structure and/or selectable by a pointing device; a scrambling module that may randomly scramble where at least a portion of the password characters are positioned within the location-based structure and that such may occur on triggering of the scrambling module; and/or a triggering module that may trigger the scrambling module on the occurrence of a triggering event.

It may be that a triggering event is selected from the group of triggering events consisting of: submission of a password to an authentication module; failure of a submitted password to satisfy an authentication module; displaying the graphical user interface, passage of a predetermined amount of time; operation of an authentication module; and entering a username. It may be that the location-base structure is a virtual 3-dimensional object and/or the graphical-user interface includes controls for changing a view of the 3-dimensional object.

There may be a username entry module that may display a username entry interface that is a separate display from the graphical user interface. There may also be a password management module that may be functionally coupled to the graphical user interface and/or to an authentication module. The password management module may allow a user to customize the password characters that are displayed through the graphical user interface to include user provided images and/or may allow a user to customize the location-based structure from among a group of layout options.

It may be that the graphical user interface includes an array of numbers and/or letters that are not scrambled by the scramble module on triggering thereof. It may be that the location-based structure is randomly selected from a group of location-based structures and that such may occur on triggering of the scramble module. It may be that a portion of the plurality of password characters are non-alpha-numeric characters.

In another non-limiting embodiment, there is a password entry user interface system that operates in the context of a computing system, comprising one or more of: a graphical user interface that may be operating on a computing system and/or includes a plurality of password characters that may be displayed on a screen of the computing system and such display may be according to a location-based structure and/or may be selectable by a device, such as but not limited to a pointing device that may be functionally coupled to the computing system, and/or wherein a portion of the password characters are images that are not alpha-numeric; a scrambling module that may be functionally coupled to a processor of the computing system and/or that randomly scrambles where at least a portion of the password characters are positioned within the location-based structure and that such may occur on triggering of the scrambling module; and/or a triggering module that triggers the scrambling module on the occurrence of a triggering event, and it may be that such that on each new attempt to enter a password, at least a portion of the password characters are positioned differently from how they were positioned on an immediately previous attempt.

It may be that the graphical user interface includes an array of numbers and letters that are not scrambled by the scramble module on triggering thereof.

There may be a username entry module that may display a username entry interface that may be a separate display from the graphical user interface. There may be a password management module that may be functionally coupled to the graphical user interface and/or to an authentication module, and it may be that the password management module allows a user to customize the password characters that are displayed through the graphical user interface to include user provided images and/or allows a user to customize the location-based structure from among a group of layout options.

It may be that the location-based structure is randomly selected from a group of location-based structures and that such may occur on triggering of the scramble module. It may be that the location-base structure is a virtual 3-dimensional object and the graphical-user interface includes controls for changing a view of the 3-dimensional object.

In still another non-limiting embodiment, there is a method of receiving password input information from a user in a computing system that may be for the purpose of authentication, comprising the steps of one or more of: providing a graphical user interface on a display of the computing system; displaying a plurality of password characters on a physical display of the computing system wherein such display may be according to a location-based structure, and/or wherein a plurality of the password characters are displayed in random locations within the location-based structure; displaying a cursor on the display, the cursor may be functionally coupled to a pointing device of the computing system such that a user may select password characters using the pointing device to manipulate the cursor; recording selected password characters as they are selected through the cursor; and/or submitting the recorded selected password characters to a password authentication module.

It may be that a second plurality of password characters are displayed in fixed, non-random locations within the location-based structure. It may be that at least a portion of the password characters are user defined images that are not alpha-numeric characters. There may be a step of changing a view of a virtual 3-dimensional location-based structure in response to a user input.

It is an objective of the present invention to address current and future logon password protection methods by providing alternative solutions to current password protection method. Solutions consists of expanding user input options beyond fixed alphanumeric characters by providing object(s) and character(s) selection. Changing the traditional layout for a password logon screen to a more dynamic, visual layout presentation. Continuous variable password and encryption management method of objects, layout and characters. Eliminating the need for traditional keyboard password input. A change in current password security philosophy, providing a new more effective & adaptable design method, maximizing access control/security, and providing a flexible design to adapt and meet new technologies.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
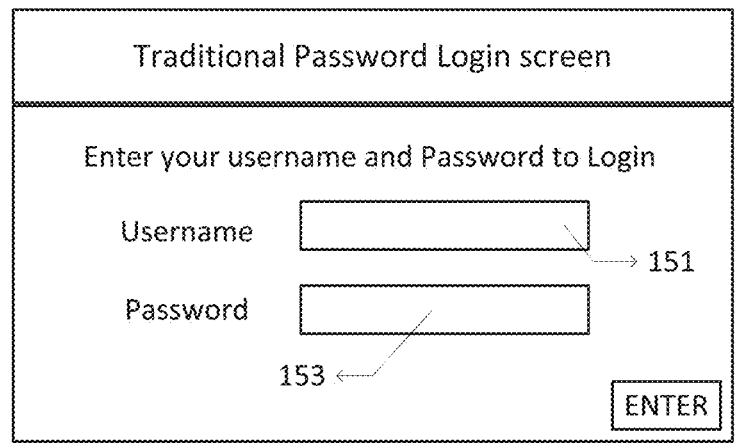
FIG. 1 is an exemplary user interface of a traditional password login.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor, a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

As used herein, "comprising," "including," "containing," "is," "are," "characterized by," and grammatical equivalents thereof are inclusive or open-ended terms that do not exclude additional unrecited elements or method steps.

"Comprising" is to be interpreted as including the more restrictive terms "consisting of" and "consisting essentially of."

FIG. 1 is an exemplary user interface of a traditional password login. There is shown a user interface having a free-text entry box for entry of a username 151 and a free-text entry box for entry of a password 153. In operation, a user selects each box and enters, through a keyboard/keypad their username and password, then selects enter to submit that information to an authentication module. However, there are many problems surrounding this form of password entry that require that users frequently change their passwords and have long passwords that are difficult to remember. In circumstances where high security is required over a long period of time, it can be very difficult, especially as time goes on, for users to maintain the necessary security protocols.

An authentication module, as used herein, authenticates a submitted password (generally an ordered string of password entry characters that has been encrypted for transmission over a network) against a database, generally also encrypted, that stores valid passwords. The authentication module may include instructions for managing identity and access, such as those used in such IAM systems.

Figure 2:
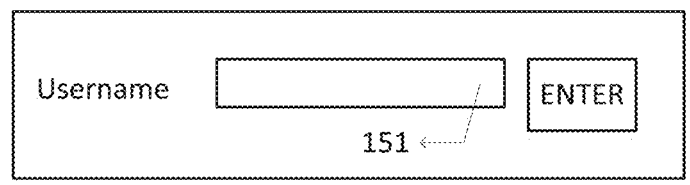
FIG. 2 is a username entry interface according to one embodiment of the invention.

FIG. 2 is a username entry interface according to one embodiment of the invention. There is shown a freeform-text entry box for entry of a username 151 and an enter button. Accordingly, a user may enter their username and then submit the same to a system for password entry according to one embodiment of the invention. Once the username is entered into the system, the system may present a password entry user interface that is customized to that particular user. The username entry interface is controlled by a username entry module that displays a username entry interface that is a separate display from the graphical user interface.

Figure 3:
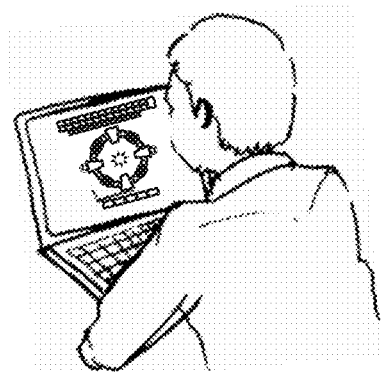
FIG. 3 is a perspective view of a user operating a computing device displaying a password entry interface according to one embodiment of the invention.

FIG. 3 is a perspective view of a user operating a computing device displaying a password entry interface according to one embodiment of the invention. There is shown a user operating a computing device that displays a password entry user interface according to one embodiment of the invention. The user is able to utilize an input device, such as but not limited to a mouse, trackball, keyboard, keypad, touchscreen or the like or combinations thereof to then enter a password into the user interface and thereby submit the same to an authentication module (e.g. to login to an application, gain access to files, unencrypt files).

FIGS. 4-10 illustrate a series of prophetic screenshots of a password entry user interface showing a sequence of receiving password input, submitting the same and then scrambling a portion of the password characters according to one embodiment of the invention. There is shown a static array of selectable password entry characters 100 disposed above a dynamic array of selectable password entry characters arranged according to a location-based structure (i.e. the illustrated wheel having the numbers 101; images of vehicles 104, 106, 106, and 113; and the images of entities 102, 103, 108, and 110). It is noted that a portion of the plurality of password characters are non-alpha-numeric characters. The dynamic array of password entry characters encircles an enter button 109 and is disposed over a selection entry box wherein sequentially selected password entry characters are displayed as they are entered. The password entry characters are selectable by using a pointing device functionally coupled to the user interface to control the cursor 200 and thereby make selections of password entry characters from those displayed on the user interface.

Figure 4:
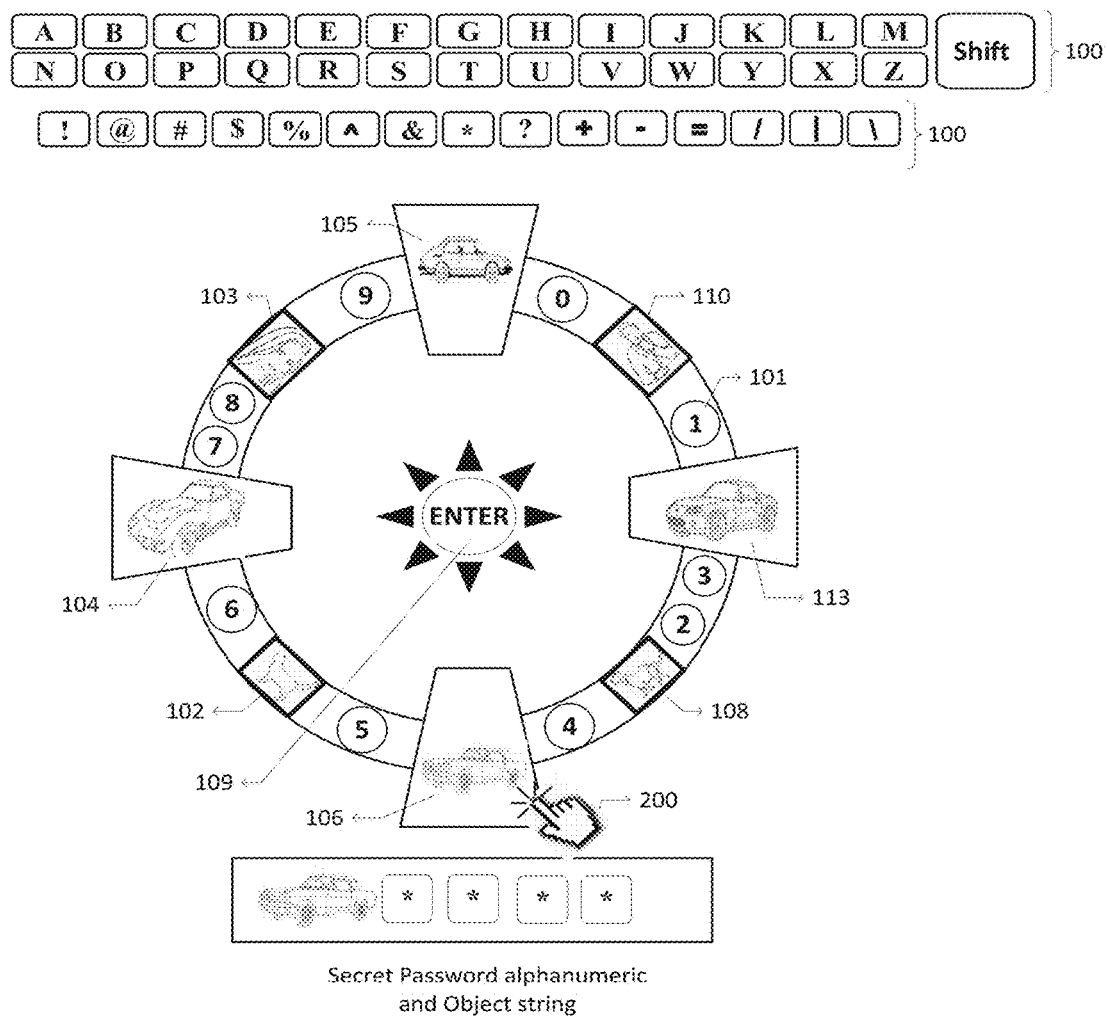
FIG. 4 is a password entry interface according to one non-limiting embodiment of the invention, wherein a first password character has been entered through the interface.
Figure 5:
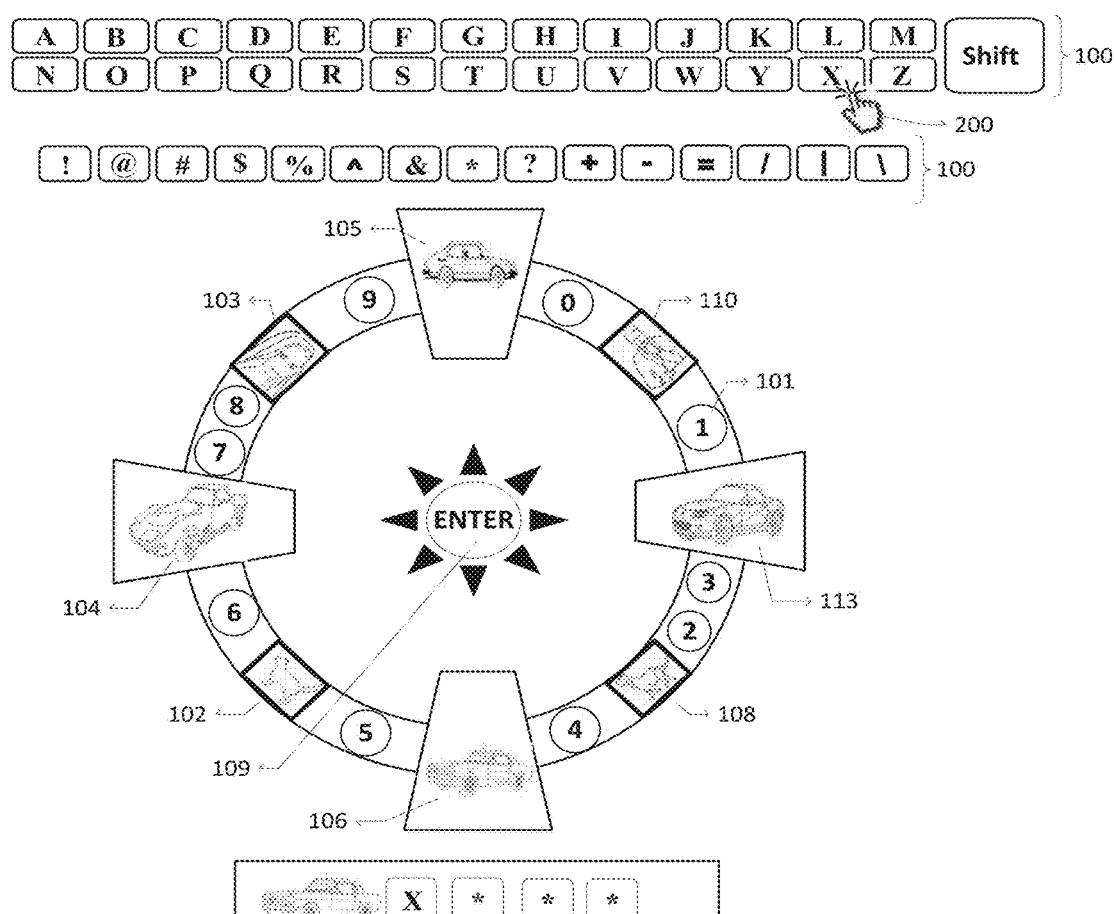
FIG. 5 is a password entry interface according to one non-limiting embodiment of the invention, wherein a first and a second password character has been entered through the interface.
Figure 6:
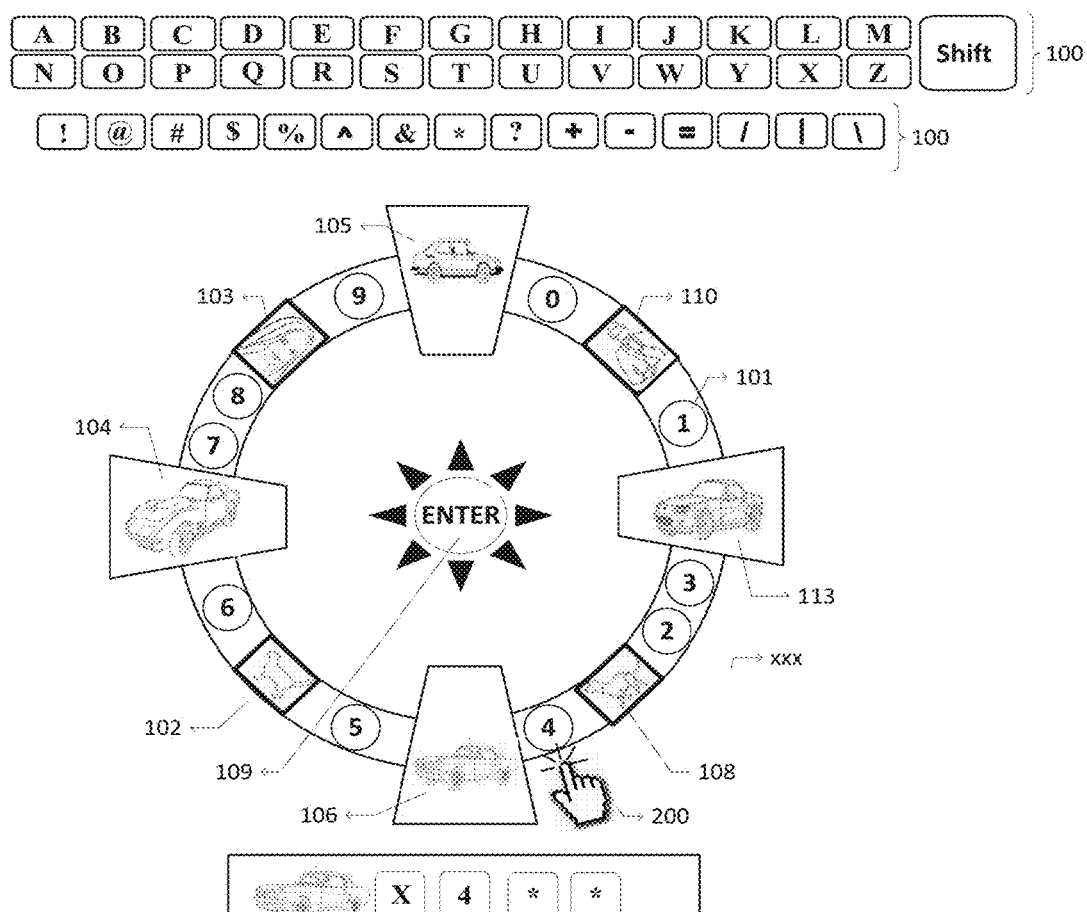
FIG. 6 is a password entry interface according to one non-limiting embodiment of the invention, wherein first, second and third password characters have been entered through the interface.
Figure 7:
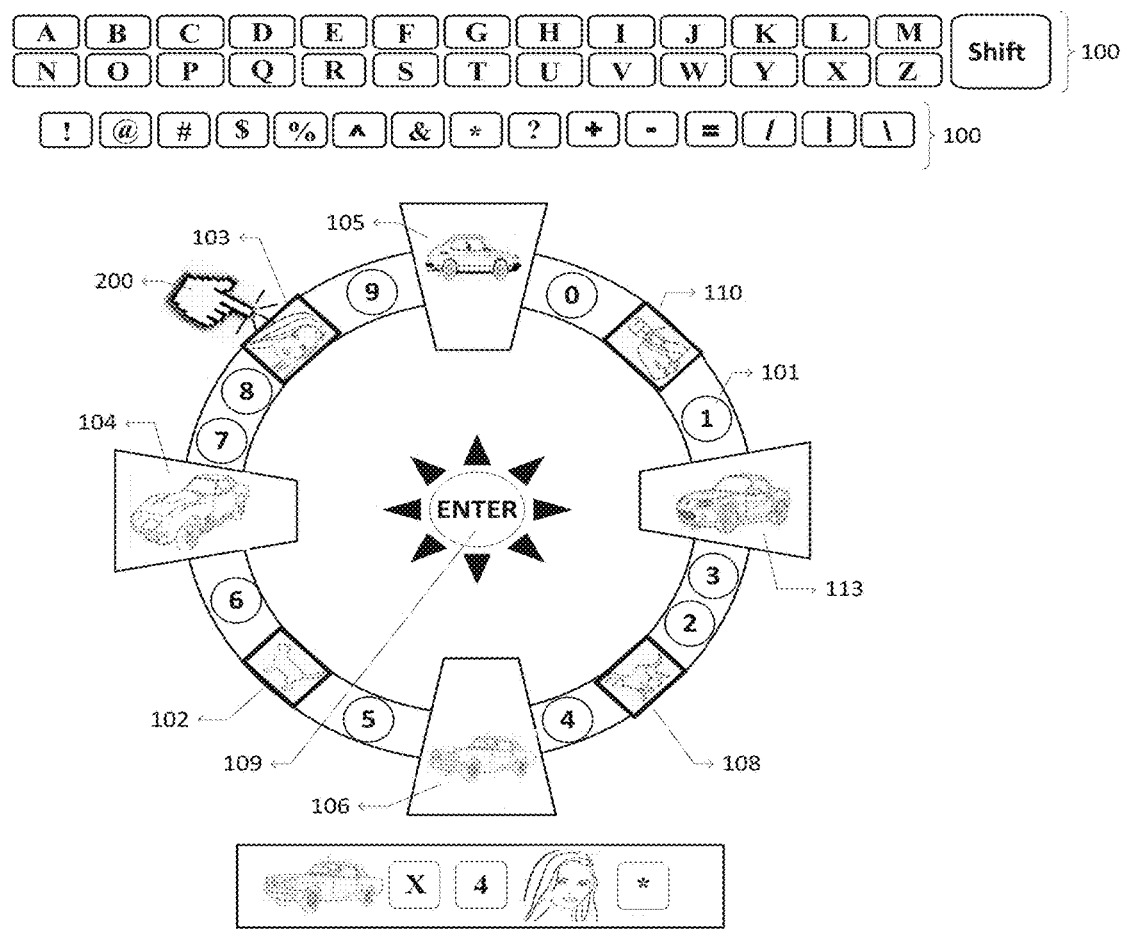
FIG. 7 is a password entry interface according to one non-limiting embodiment of the invention, wherein first, second, third, and fourth password characters have been entered through the interface.
Figure 8:
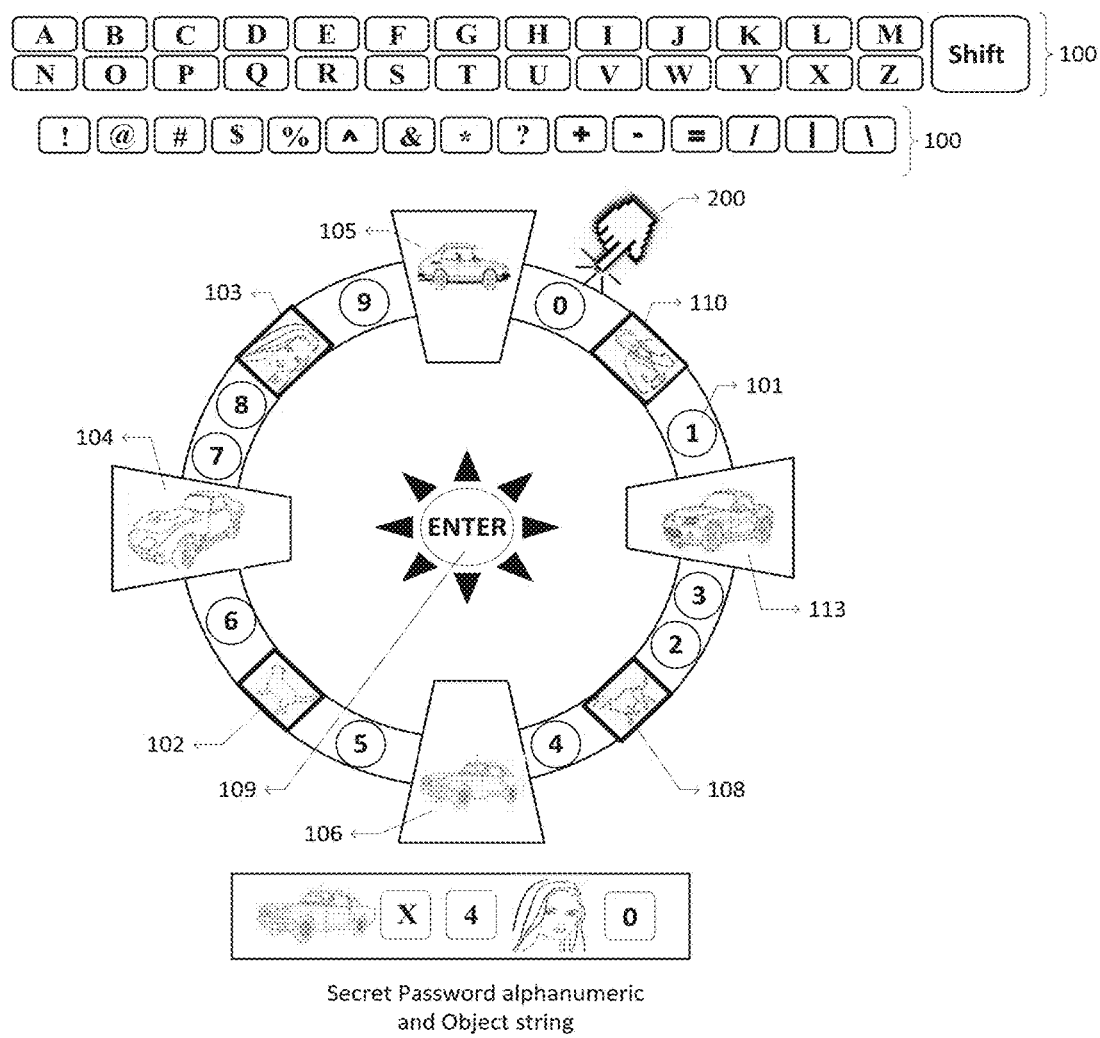
FIG. 8 is a password entry interface according to one non-limiting embodiment of the invention, wherein first, second, third, fourth, and fifth password characters have been entered through the interface.
Figure 9:
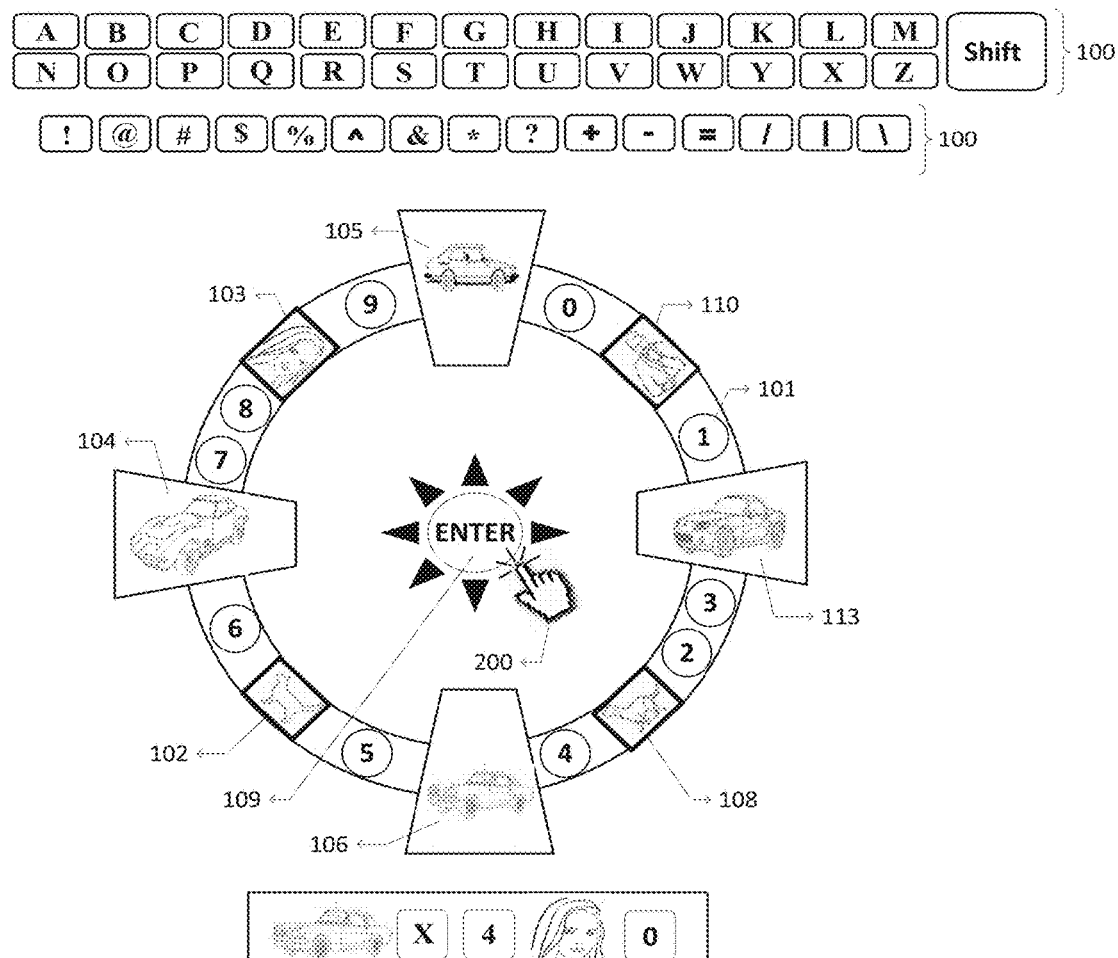
FIG. 9 is a password entry interface according to one non-limiting embodiment of the invention, wherein first, second, third, fourth, and fifth password characters have been entered through the interface and the user is selecting to enter the illustrated five character password into an authentication system.
Figure 10:
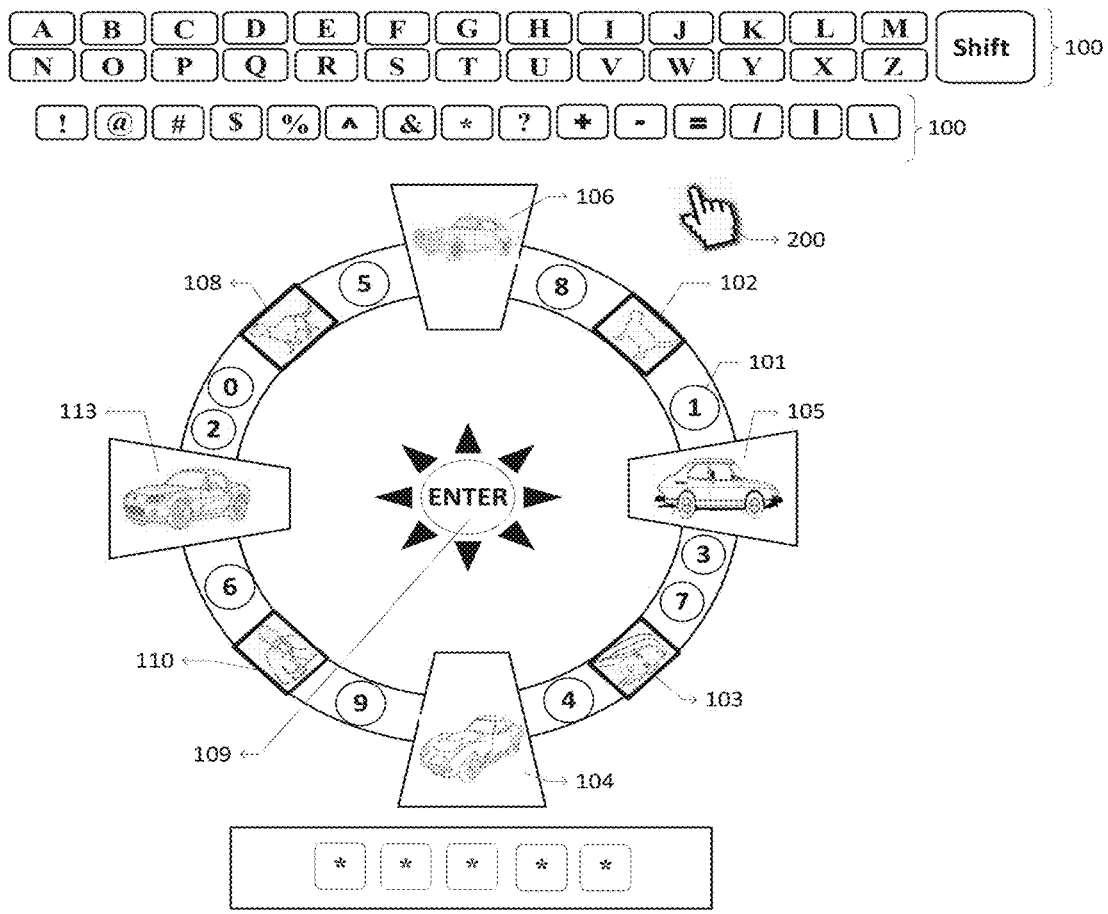
FIG. 10 is a password entry interface according to one non-limiting embodiment of the invention, wherein selectable password characters illustrated through the user interface are scrambled as compared to those presented in FIGS. 4-9 so as to present a new opportunity to enter a password.

Looking at the figures as an ordered progression of actions taken by a user: FIG. 4 shows a first selected character 106 in the selection entry box; FIG. 5 shows that the letter X is the second selection made by the user from the static array of characters; FIG. 6 shows that the number 4 is the third selection made by the user from the dynamic array; FIG. 7 shows that the female face 103 is the fourth selection; FIG. 8 shows that the number 0 is the fifth selection; FIG. 9 shows that user is clicking the enter button 109 to submit the password for authentication through an authentication module functionally coupled to the user interface; and FIG. 10 shows that the user interface has scrambled due to occurrence of a triggering event (e.g. the password authentication failed and the user it presented with a new opportunity to enter the password). Note that in FIG. 10, the graphical user interface includes an array of password entry characters 100 that are not scrambled by the scramble module on triggering thereof.

Accordingly, there is shown a password entry user interface that operates in the context of a computing device (e.g. smartphone, tablet, laptop, desktop computer), comprising a graphical user interface including a plurality of password characters displayed on a screen according to a location-based structure and selectable by a pointing device; a scrambling module that randomly scrambles where at least a portion of the password characters are positioned within the location-based structure on triggering of the scrambling module; and a triggering module that triggers the scrambling module on the occurrence of a triggering event.

Additionally, there is a password entry user interface that operates in the context of a computing system (e.g. multiple computing devices functionally coupled over a network), comprising a graphical user interface operating on a computing system and including a plurality of password characters displayed on a screen of the computing system according to a location-based structure and selectable by a pointing device that is functionally coupled to the computing system, wherein a portion of the password characters are images that are not alpha-numeric; a scrambling module functionally coupled to a processor of the computing system that randomly scrambles where at least a portion of the password characters are positioned within the location-based structure on triggering of the scrambling module; and a triggering module that triggers the scrambling module on the occurrence of a triggering event, such that on each new attempt to enter a password, at least a portion of the password characters are positioned differently from how they were positioned on an immediately previous attempt.

Advantageously, such interfaces along with respective systems and/or devices allow for high variety in passwords while obscuring the passwords themselves in relation to the actions taken to enter them into the password entry interface. Accordingly, someone with access to keyboard logs, pointer movement history, and the like would not be able to successfully reproduce a password entry. Thus passwords may be shorter and/or not need to be changed as often.

Figure 11:
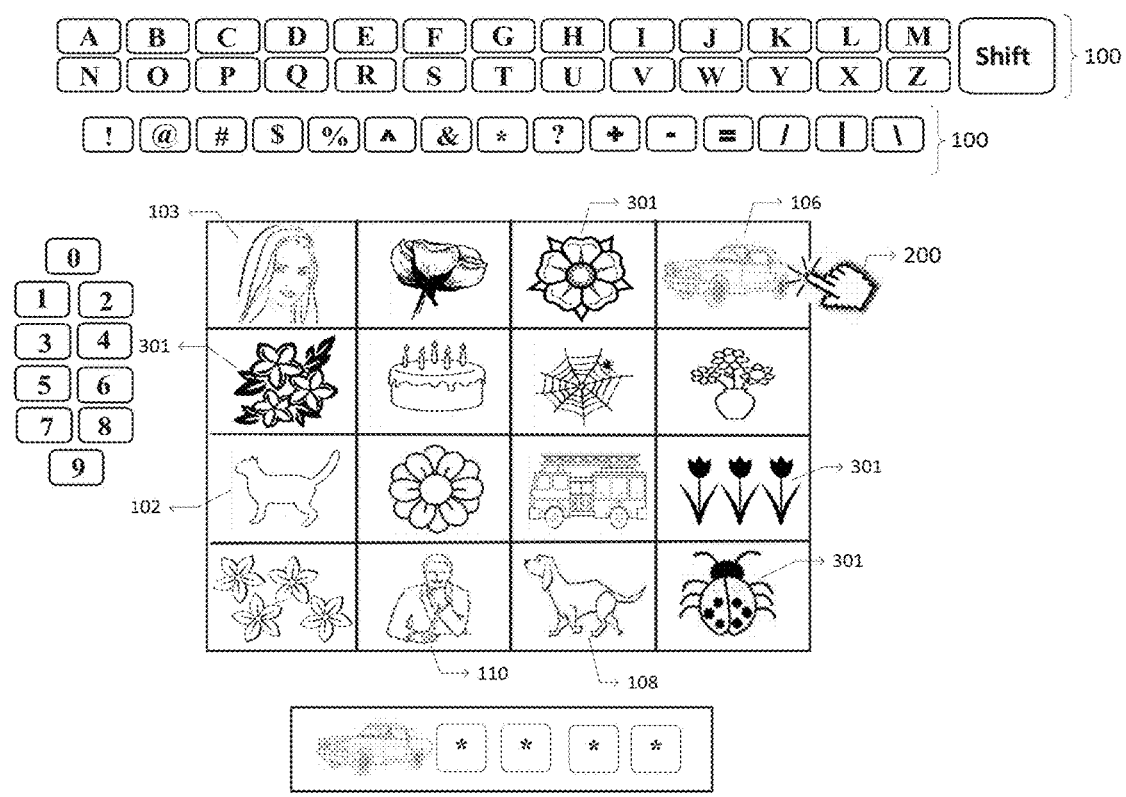
FIG. 11 is a password entry interface according to one non-limiting embodiment of the invention, wherein a first password character has been entered through the interface.
Figure 12:
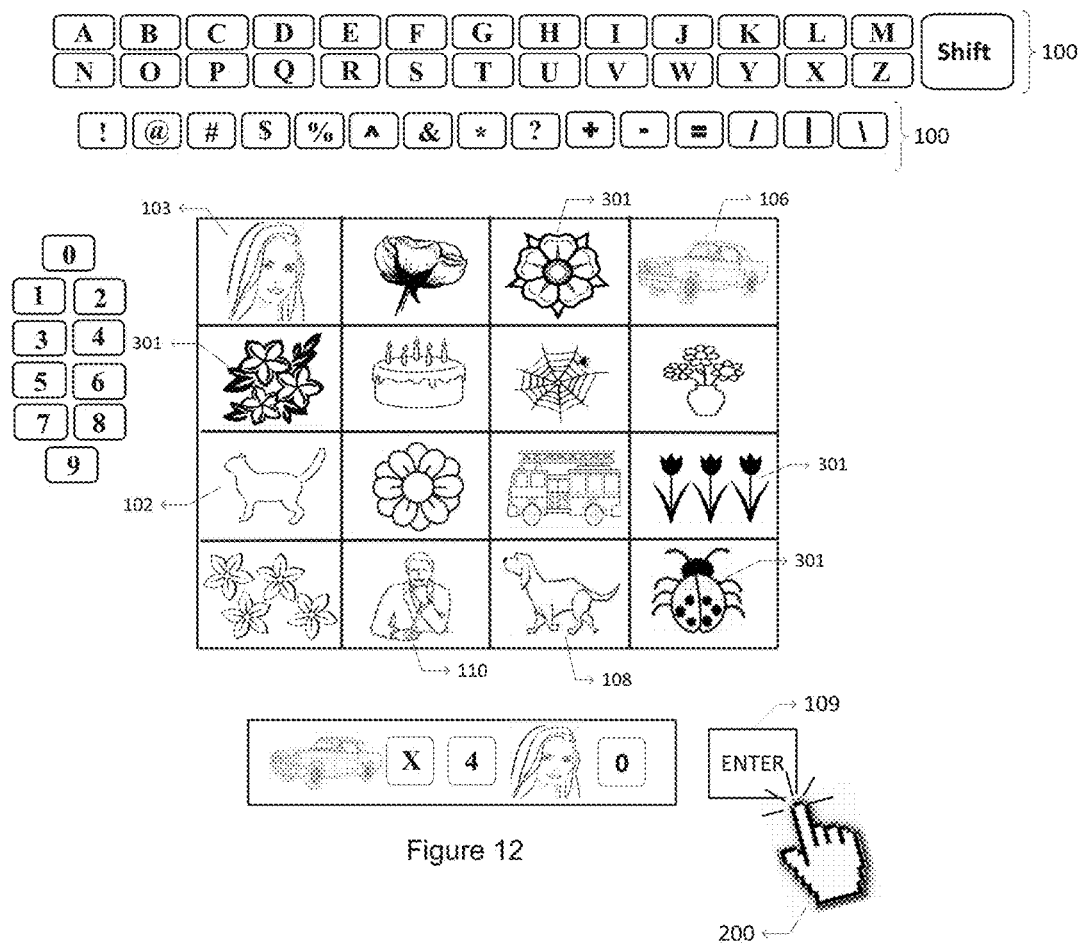
FIG. 12 is a password entry interface according to one non-limiting embodiment of the invention, wherein first, second, third, fourth, and fifth password characters have been entered through the interface and the user is selecting to enter the illustrated five character password into an authentication system.
Figure 13:
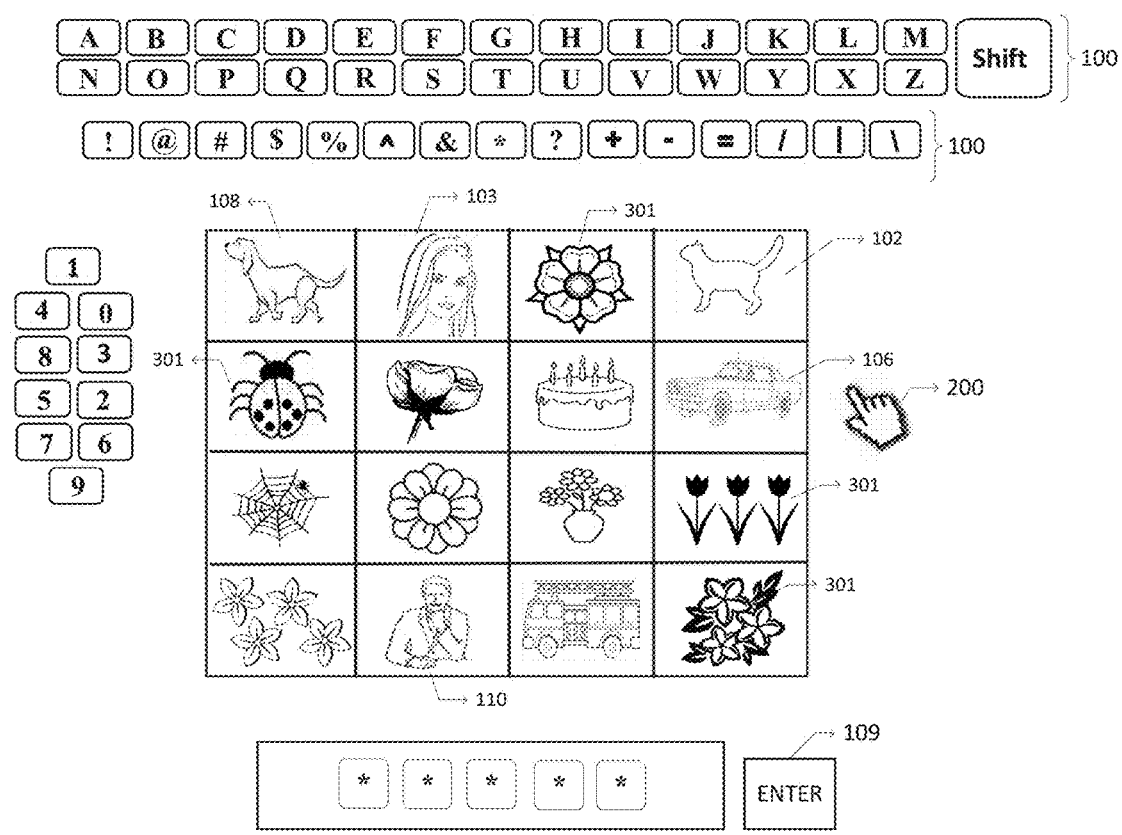
FIG. 13 is a password entry interface according to one non-limiting embodiment of the invention, wherein selectable password characters illustrated through the user interface are scrambled as compared to those presented in FIGS. 11 and 12 so as to present a new opportunity to enter a password.

FIGS. 11-13 illustrate a sequence of receiving password input, submitting the same and then scrambling a portion of the password characters according to one embodiment of the invention. There is shown a static array of password entry characters 100 and a dynamic array of password entry characters arranged according to a location-based structure (i.e. the grid of 16 images, 4×4, disposed below the static array) that is different from the location-based structure of FIGS. 4-10. There is shown a woman's face 103, various nature images 301, a vehicle 106 with a cursor 200 near thereto, a cat 102, a man resting his chin on his fist 110, and a dog 108.

Looking to the figures as an ordered sequence of password entry by a user: FIG. 11 is a password entry interface according to one non-limiting embodiment of the invention, wherein a first password character has been entered through the interface; FIG. 12 is a password entry interface according to one non-limiting embodiment of the invention, wherein first, second, third, fourth, and fifth password characters have been entered through the interface and the user is selecting to enter the illustrated five character password into an authentication system; and FIG. 13 is a password entry interface according to one non-limiting embodiment of the invention, wherein selectable password characters illustrated through the user interface are scrambled as compared to those presented in FIGS. 11 and 12 so as to present a new opportunity to enter a password.

Figure 14:
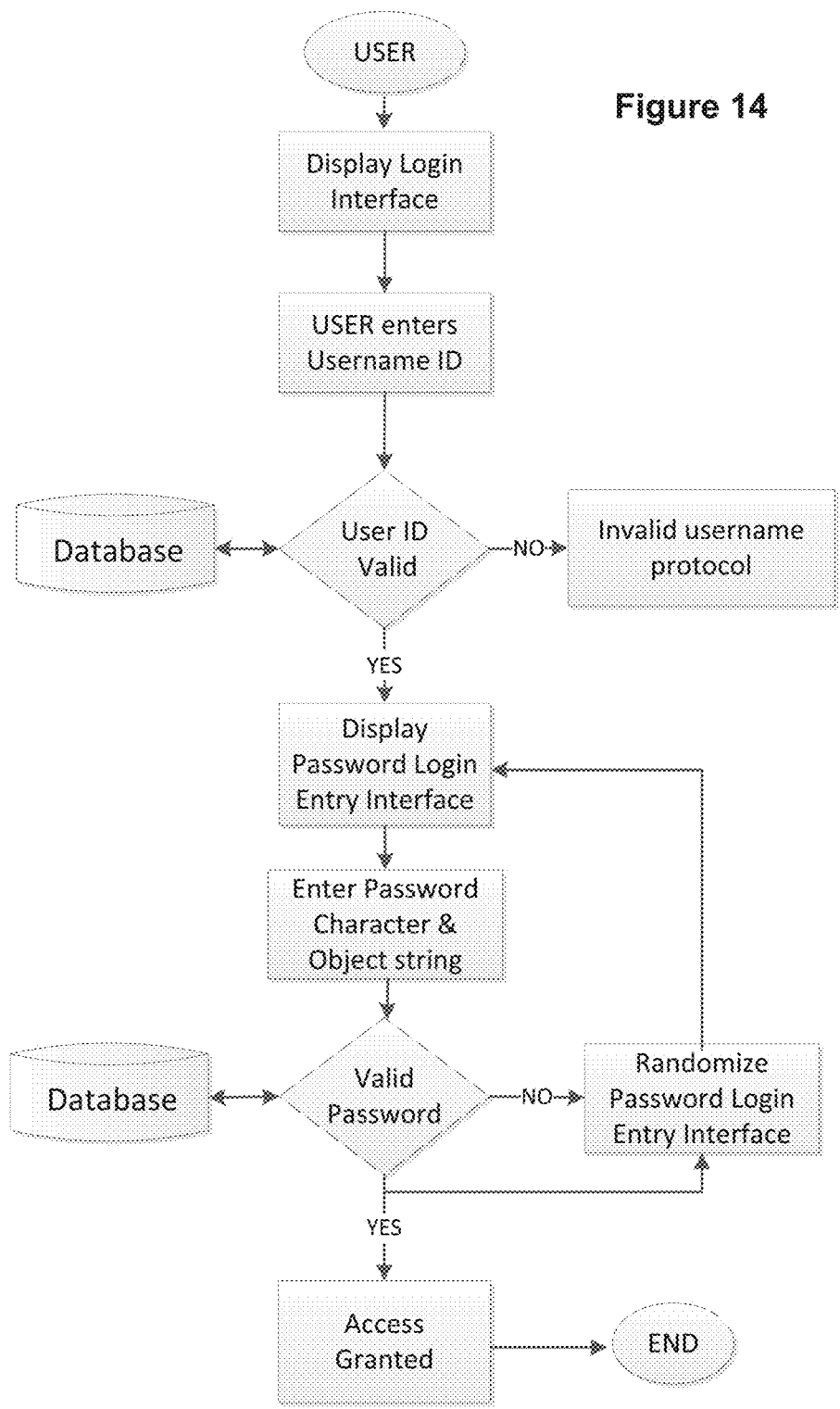
FIG. 14 is a flowchart illustrating a method of receiving a password through a user interface according to one embodiment of the invention.

FIG. 14 is a flowchart illustrating a method of receiving a password through a user interface according to one embodiment of the invention. There is shown a method of receiving password input information from a user in a computing system for the purpose of authentication.

The illustrated steps include: providing a graphical user interface on a display of the computing system (Display Login Interface); receiving a username through that interface from a user (USER enters Username ID); checking the entered username against a database of valid usernames (User ID Valid—y/n) and executing a Invalid Username Protocol if the username is invalid (e.g. resetting the display; notifying the user of the invalid entry; producing a dummy password entry screen); displaying a plurality of password characters on a physical display of the computing system according to a location-based structure, wherein a plurality of the password characters are displayed in random locations within the location-based structure (Display Password Login Entry Interface) and displaying a cursor on the display, the cursor functionally coupled to a pointing device of the computing system such that a user may select password characters using the pointing device to manipulate the cursor whereby the user interface records selected password characters as they are selected through the cursor; submitting the recorded selected password characters to a password authentication module and using an authentication module to check the password entry submitted through the password entry user interface against a database storing the valid password (Valid Password—y/n) and either granting access if valid and triggering randomization of the password login entry interface or triggering randomization and redisplaying the password entry interface.

It may be that there is a second plurality of password characters are displayed in fixed, non-random locations within the location-based structure such that the location(s) of only some of the password entry characters are randomized on trigger. Further, it may be that at least a portion of the password characters are user defined images that are not alpha-numeric characters and such may be images uploaded by the user into the system.

Figure 15:
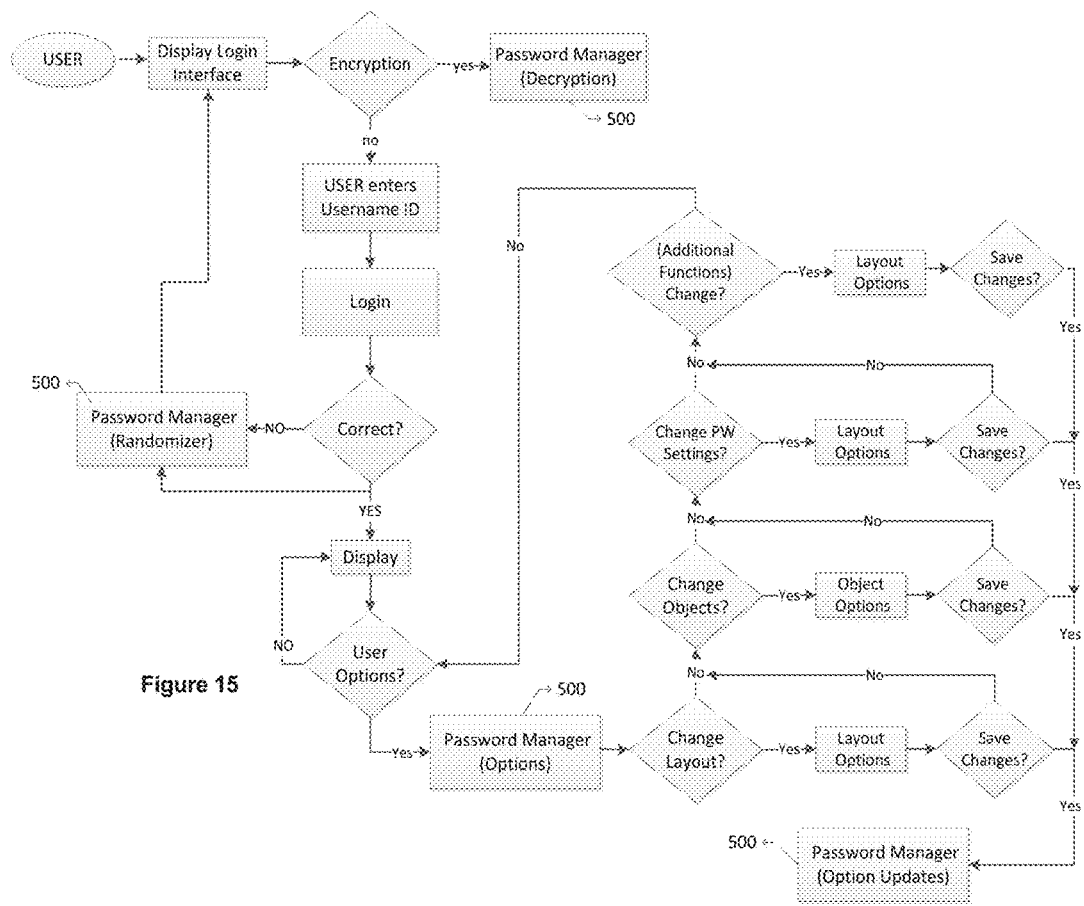
FIG. 15 is a flowchart illustrating a method of managing a password associated with a login account according to one embodiment of the invention.

FIG. 15 is a flowchart illustrating a method of managing a password associated with a login account according to one embodiment of the invention. In the illustrated sequence, a login interface is displayed to a user, generally through a mode of encryption that is managed by a password management module 500, which also manages a login process and provides a password entry user interface to the user, such as those illustrated herein. Once authenticated, the user may be presented with user options through the password manager 500, such as but not limited to changing the layout (location-based structure) that is used during the password entry process, the objects (e.g. images presented as password entry characters), the password settings (e.g. the password itself, any minimum requirements for future passwords, automatic password replacement periods), and any other changes or additional functions that the user may want to manipulate (e.g. the location based structure is randomly selected on each login attempt, or other triggering event, from a group/list of location-bases structures instead of being a fixed user-selected layout). Once changes are selected, the password manager updates the saved settings with the system so that they may be effective.

The password management module 500 may include and/or may be functionally coupled to the graphical user interface and/or to an authentication module. It may be that the password management module allows a user to customize the password characters that are displayed through the graphical user interface to include user provided images (e.g. to upload and/or create images) and or may allow a user to customize the location-based structure from among a group of layout options (e.g. select from various wheels, grids, 3D virtual objects like balls/hoops/polygons/coins, and morphable objects including but not limited to posable people/animals, vehicles and the like and combinations thereof).

FIGS. 16-22 illustrate a sequence of receiving password input, submitting the same and then scrambling a portion of the password characters according to one embodiment of the invention. There is shown a location-base structure that is a virtual 3-dimensional object (the illustrated polygon). The illustrated graphical-user interface includes controls 601, 602, 603 for changing a view of the 3-dimensional object and an indicator 604 for showing the orientation thereof. There is a static display 100 of password entry characters as well as dynamic displays of images 102, 301, 106, 103, 108, and 110 (back view of FIG. 17) that are also password entry characters.

There is a cursor 200 controlled by a pointing device that a user may use to manipulate the 3d virtual object and/or to select password entry characters displayed on the screen. It may be that not all of the password entry characters required to generate a valid password are all present on the screen at the same time, and thus the 3D virtual object must be manipulated to find the characters as they are needed for the proper password sequence entry. The 3D virtual object may be managed by a 3D object viewer module/renderer such as but not limited to those used in video games and/or CAD programs to render and display virtual 3D objects.

Figure 16:
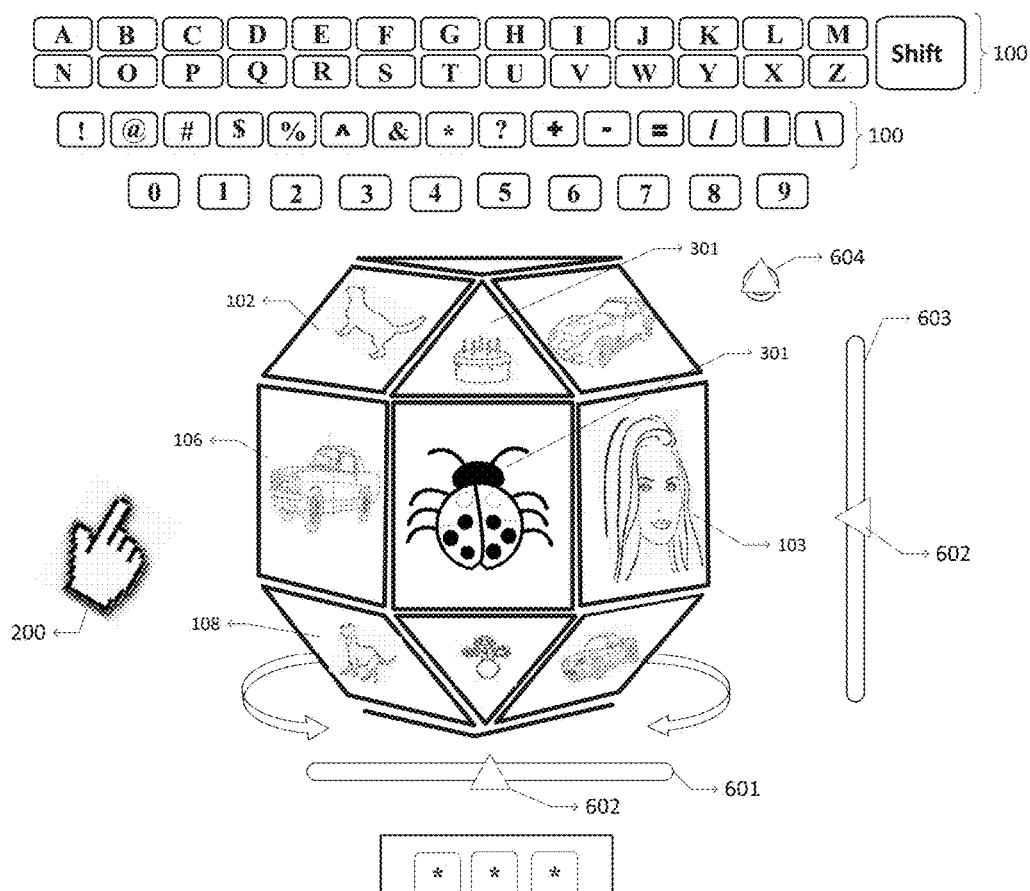
FIG. 16 is a password entry interface according to one non-limiting embodiment of the invention, wherein the interface simulates a 3-dimensional object having selectable password characters thereon.
Figure 17:
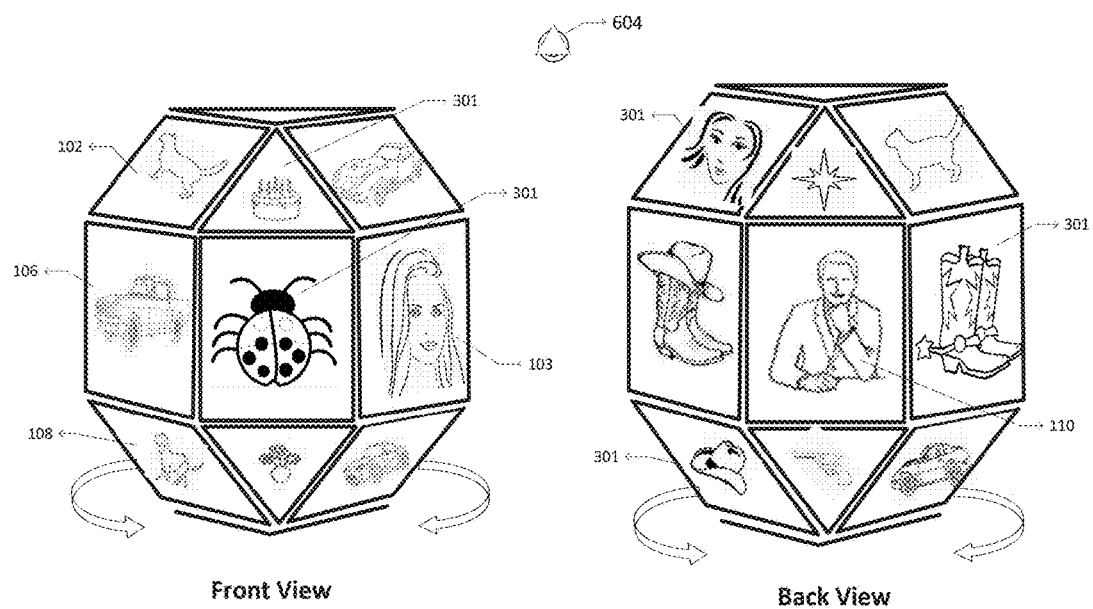
FIG. 17 illustrates simultaneous front and back views of a 3-dimensional object having selectable password characters thereon.
Figure 18:
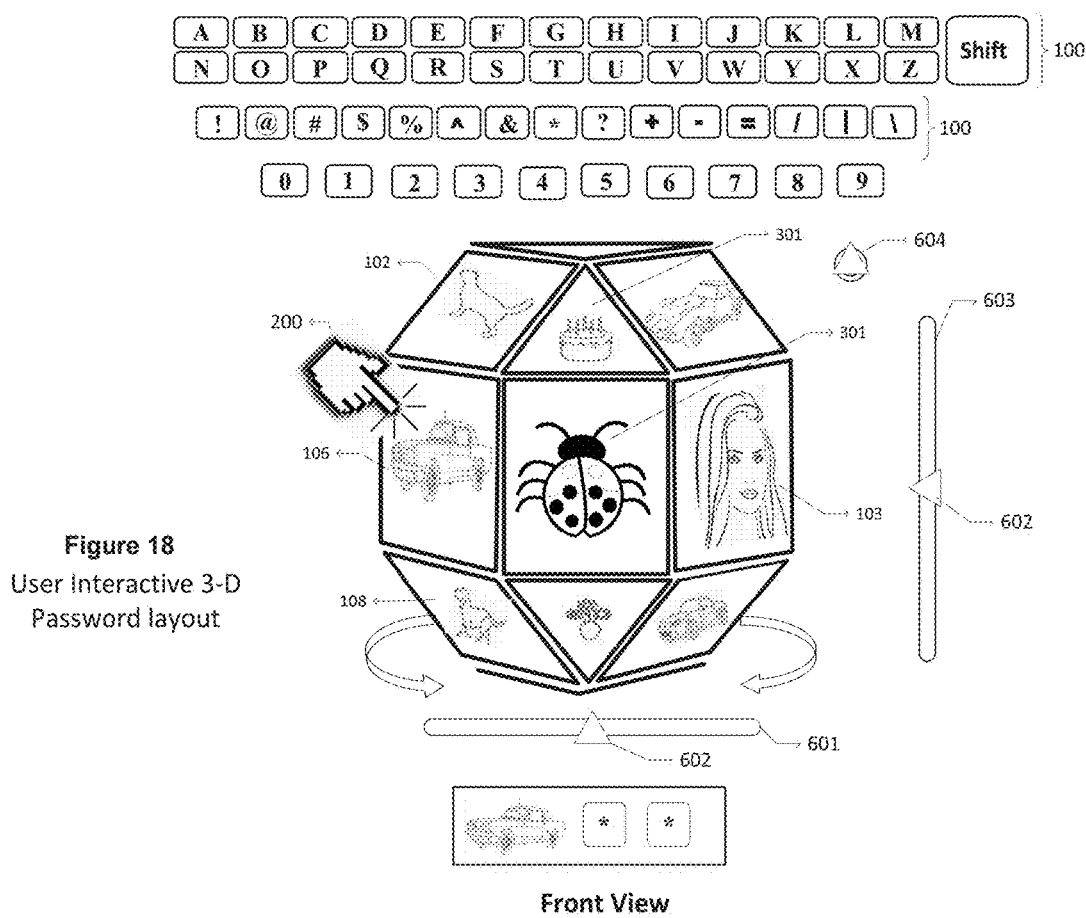
FIG. 18 a password entry interface according to one non-limiting embodiment of the invention, wherein the interface simulates a 3-dimensional object having selectable password characters thereon and wherein a first password character has been entered.
Figure 19:
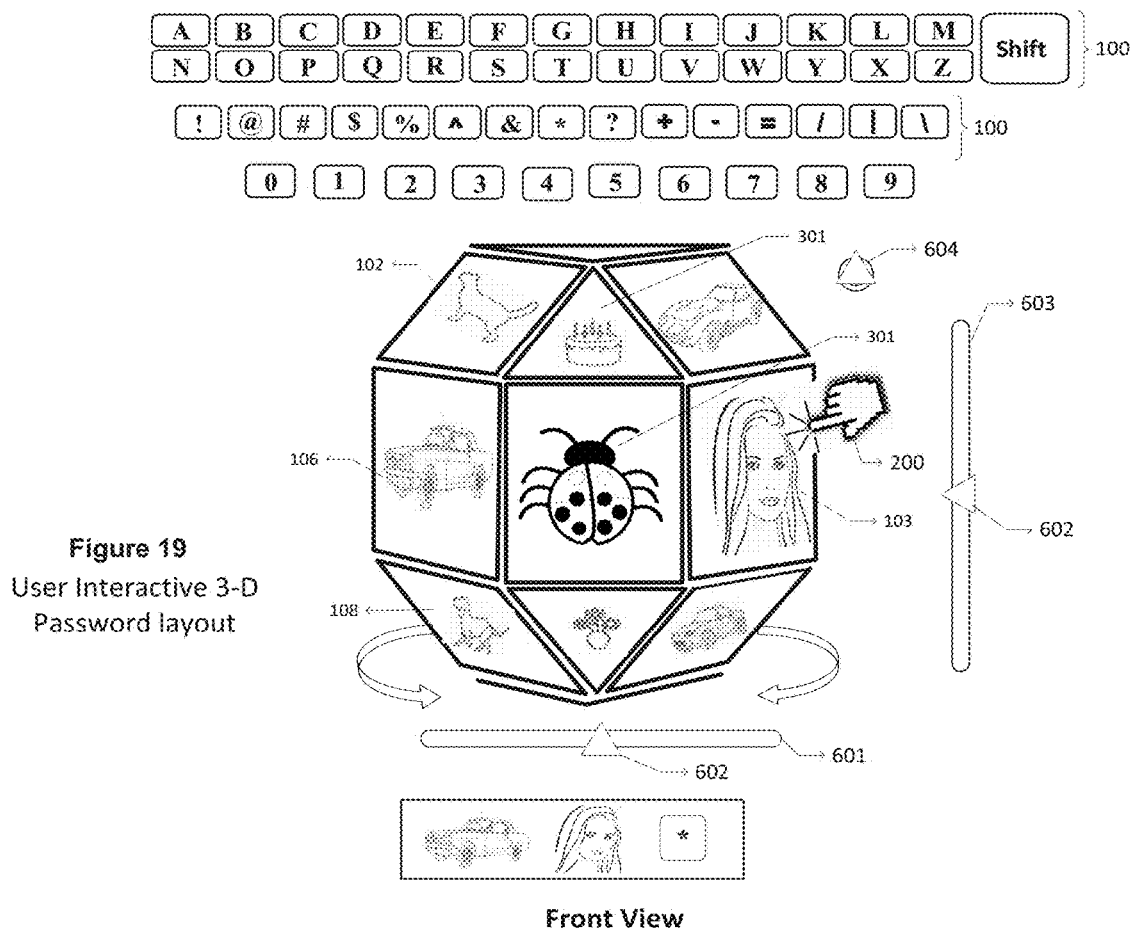
FIG. 19 is password entry interface according to one non-limiting embodiment of the invention, wherein the interface simulates a 3-dimensional object having selectable password characters thereon and wherein first and second password characters have been entered.
Figure 20:
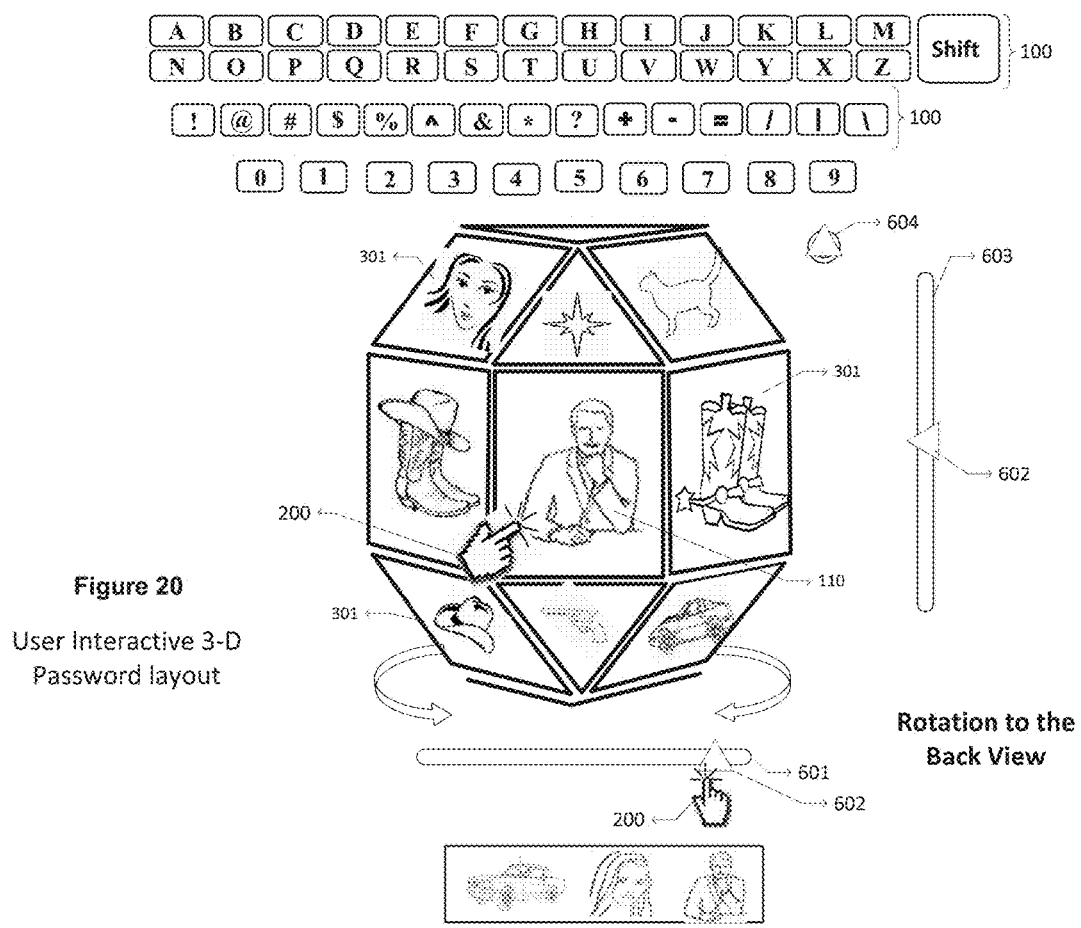
FIG. 20 is a password entry interface according to one non-limiting embodiment of the invention, wherein the interface simulates a 3-dimensional object having selectable password characters thereon and wherein first, second, and third password characters have been entered and wherein entry of the third password character required rotation of the 3-dimensional object.
Figure 21:
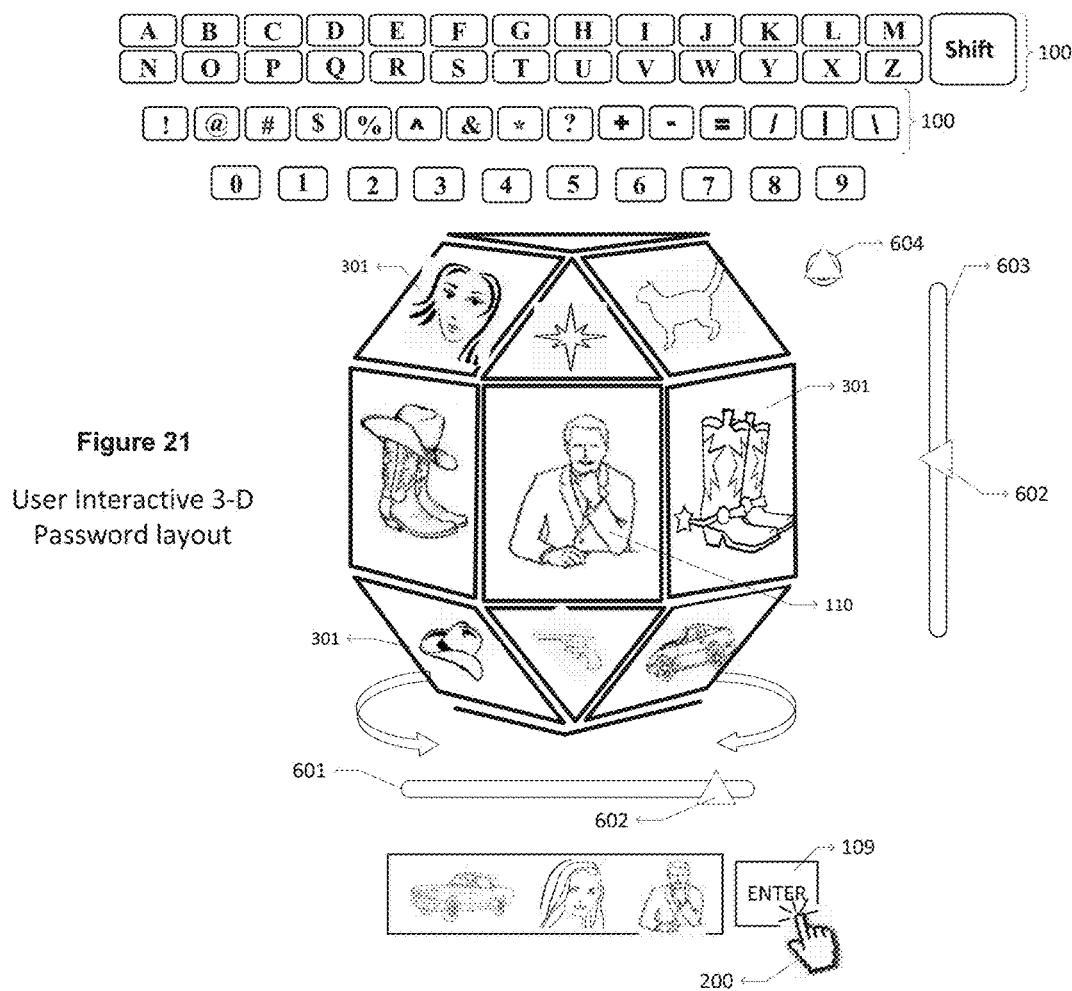
FIG. 21 is a password entry interface according to one non-limiting embodiment of the invention, wherein the interface simulates a 3-dimensional object having selectable password characters thereon and wherein first, second, and third password characters have been entered and wherein the user is selecting to enter the password into an authentication system through the password entry interface.
Figure 22:
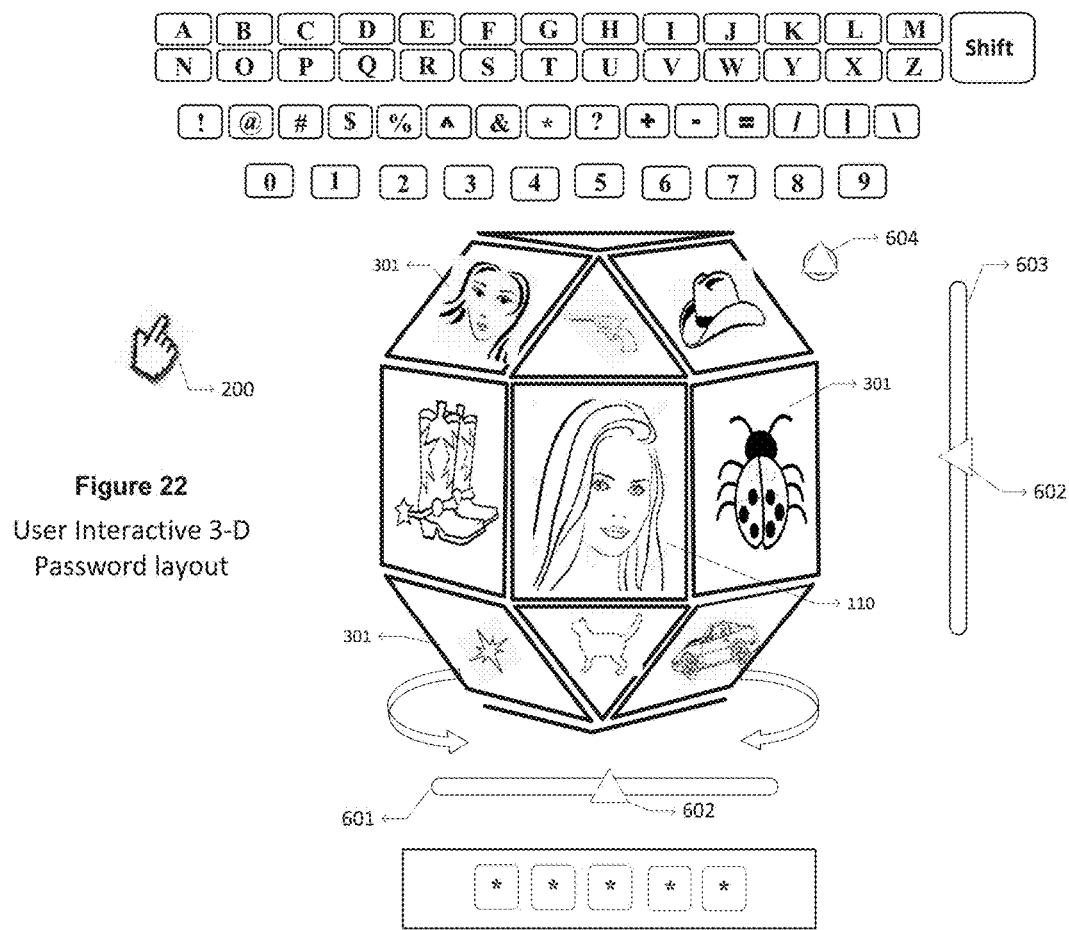
FIG. 22 is a password entry interface according to one non-limiting embodiment of the invention, wherein the interface simulates a 3-dimensional object having selectable password characters thereon and wherein selectable password characters are scrambled on the user interface as compared to those shown in FIGS. 16-21 so as to present a new opportunity to enter a password.

Looking at the figures as an ordered sequence of a password entry process: FIG. 16 is a password entry interface according to one non-limiting embodiment of the invention, wherein the interface simulates a 3-dimensional object having selectable password characters thereon and no password entry characters have yet been selected; FIG. 17 illustrates simultaneous front and back views of a 3-dimensional object having selectable password characters thereon thereby illustrating what a user may see as the 3D virtual object is manipulated; FIG. 18 a password entry interface according to one non-limiting embodiment of the invention, wherein the interface simulates a 3-dimensional object having selectable password characters thereon and wherein a first password character has been entered; FIG. 19 is password entry interface according to one non-limiting embodiment of the invention, wherein the interface simulates a 3-dimensional object having selectable password characters thereon and wherein first and second password characters have been entered; FIG. 20 is a password entry interface according to one non-limiting embodiment of the invention, wherein the interface simulates a 3-dimensional object having selectable password characters thereon and wherein first, second, and third password characters have been entered and wherein entry of the third password character required rotation of the 3-dimensional object; FIG. 21 is a password entry interface according to one non-limiting embodiment of the invention, wherein the interface simulates a 3-dimensional object having selectable password characters thereon and wherein first, second, and third password characters have been entered and wherein the user is selecting to enter the password into an authentication system through the password entry interface; and FIG. 22 is a password entry interface according to one non-limiting embodiment of the invention, wherein the interface simulates a 3-dimensional object having selectable password characters thereon and wherein selectable password characters are scrambled on the user interface as compared to those shown in FIGS. 16-21 so as to present a new opportunity to enter a password.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although specific location-based structures are illustrated, it is understood that the variety of such structures are plethoric.

Additionally, although the figures illustrate particular image files and keyboard/keypad layouts, it is understood that the images and keyboard/keypad layouts that may be used are plethoric.

Further, while a particular triggering event is illustrated in FIG. 14, there may be other triggering events, such as but not limited to wherein the triggering event is selected from the group of triggering events consisting of: submission of a password to an authentication module; failure of a submitted password to satisfy an authentication module; displaying the graphical user interface, passage of a predetermined amount of time; operation of an authentication module; and entering a username; and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A password entry user interface that operates in the context of a computing device, comprising:
  a graphical user interface comprising a plurality of password characters according to a location-based structure and selectable by a pointing device;
  a scrambling module that randomly scrambles a first portion the plurality of password characters within the location-based structure on triggering of the scrambling module, wherein a second portion of the plurality of password characters are located in fixed locations within the location-based structure such that the second portion of the plurality of password characters are not scrambled on triggering of the scrambling module; and
  a triggering module that triggers the scrambling module on the occurrence of a triggering event.

2. The user interface of claim 1, wherein the triggering event is selected from the group of triggering events consisting of: submission of a password to an authentication module; failure of a submitted password to satisfy an authentication module; displaying the graphical user interface, passage of a predetermined amount of time; operation of an authentication module; and entering a username.

3. The user interface of claim 1, wherein the location-based structure is a virtual 3-dimensional object and the graphical-user interface includes controls for changing a view of the 3-dimensional object.

4. The user interface of claim 1, further comprising a username entry module that displays a username entry interface that is a separate display from the graphical user interface.

5. The user interface of claim 1, further comprising a password management module functionally coupled to the graphical user interface and to an authentication module, wherein the password management module allows a user to customize the password characters that are displayed through the graphical user interface to include user provided images.

6. The user interface of claim 1, wherein the graphical user interface includes an array of numbers and letters that are not scrambled by the scramble module on triggering thereof.

7. The user interface of claim 1, further comprising a password management module functionally coupled to the graphical user interface and to an authentication module, wherein the password management module allows a user to customize the location-based structure from among a group of layout options.

8. The user interface of claim 1, wherein the location-based structure is randomly selected from a group of location-based structures on triggering of the scramble module.

9. The user interface of claim 1, wherein a portion of the plurality of password characters are non-alpha-numeric characters, the non-alpha-numeric password characters comprising images that are uploaded by a user.

10. A password entry user interface system that operates in the context of a computing system, comprising:
  a graphical user interface operating on a computing system and comprising a plurality of password characters displayed on a screen of the computing system according to a location-based structure and selectable by a pointing device that is functionally coupled to the computing system, wherein a portion of the password characters are images that are not alpha-numeric;
  a scrambling module functionally coupled to a processor of the computing system that randomly scrambles a first portion the plurality of password characters within the location-based structure on triggering of the scrambling module, wherein a second portion of the plurality of password characters are located in fixed locations within the location-based structure such that the second portion of the plurality of password characters are not scrambled on triggering of the scrambling module; and
  a triggering module that triggers the scrambling module on the occurrence of a triggering event, such that on each new attempt to enter a password, at least a portion of the password characters are positioned differently from how they were positioned on an immediately previous attempt.

11. The system of claim 10, wherein the graphical user interface includes an array of numbers and letters that are not scrambled by the scramble module on triggering thereof.

12. The system of claim 11, further comprising a username entry module that displays a username entry interface that is a separate display from the graphical user interface.

13. The system of claim 12, further comprising a password management module functionally coupled to the graphical user interface and to an authentication module, wherein the password management module allows a user to customize the password characters that are displayed through the graphical user interface to include user provided images.

14. The system of claim 13, wherein the password management module allows a user to customize the location-based structure from among a group of layout options.

15. The system of claim 13, wherein the location-based structure is randomly selected from a group of location-based structures on triggering of the scramble module.

16. The system of claim 13, wherein the location-based structure is a virtual 3-dimensional object and the graphical-user interface includes controls for changing a view of the 3-dimensional object.

17. A method of receiving password input information from a user in a computing system for the purpose of authentication, comprising:
  providing a graphical user interface on a display of the computing system;
  displaying a plurality of password characters on a physical display of the computing system according to a location-based structure, wherein a first portion of a plurality of the password characters are displayed in random locations within the location-based structure and a second portion of the plurality of password characters are displayed located in fixed locations within the location-based structure;
  displaying a cursor on the display, the cursor functionally coupled to a pointing device of the computing system such that a user may select password characters using the pointing device to manipulate the cursor;
  recording selected password characters as they are selected through the cursor; and
  submitting the recorded selected password characters to a password authentication module.

18. The method of claim 17, wherein at least a portion of the password characters are user defined images that are not alpha-numeric characters.

19. The method of claim 17, further comprising the step of changing a view of a virtual 3-dimensional location-based structure in response to a user input.

* * * * *